United States Patent
Carron et al.

(10) Patent No.: US 10,228,091 B2
(45) Date of Patent: Mar. 12, 2019

(54) VALVE FOR A PRESSURIZED FLUID CYLINDER AND CORRESPONDING CYLINDER

(71) Applicant: L'Air Liquide, Société Anonyme pour l'Etude et l'Exploitation des Procédés Georges Claude, Paris (FR)

(72) Inventors: Amélie Carron, Paris (FR); Beatriz Lopez, Paris (FR); Christophe Roland Rezel, Savigny sur Orge (FR); Philippe Rudnianyn, Villiers sur Orge (FR); Catherine Vivier, Saint-Egreve (FR)

(73) Assignee: L'Air Liquide, Société Anonyme pour l'Etude et l'Expoitation des Procédés Georges Claude, Paris (FR)

( * ) Notice: Subject to any disclaimer, the term of this patent is extended or adjusted under 35 U.S.C. 154(b) by 287 days.

(21) Appl. No.: 15/113,094

(22) PCT Filed: Dec. 2, 2014

(86) PCT No.: PCT/FR2014/053124
§ 371 (c)(1),
(2) Date: Jul. 21, 2016

(87) PCT Pub. No.: WO2015/110719
PCT Pub. Date: Jul. 30, 2015

(65) Prior Publication Data
US 2017/0002982 A1 Jan. 5, 2017

(30) Foreign Application Priority Data
Jan. 22, 2014 (FR) ...................................... 14 50527

(51) Int. Cl.
*F17C 13/02* (2006.01)

(52) U.S. Cl.
CPC .... *F17C 13/025* (2013.01); *F17C 2201/0104* (2013.01); *F17C 2201/0109* (2013.01);
(Continued)

(58) Field of Classification Search
None
See application file for complete search history.

(56) References Cited

U.S. PATENT DOCUMENTS

| 5,223,822 A | 6/1993 | Stommes et al. |
| 6,012,411 A | 1/2000 | Hochbrueckner |

(Continued)

FOREIGN PATENT DOCUMENTS

| EP | 2 110 949 | 10/2009 |
| EP | 2 339 222 | 6/2011 |

(Continued)

OTHER PUBLICATIONS

French Search Report and Written Opinion for corresponding FR 1450527, dated Oct. 23, 2013.

(Continued)

*Primary Examiner* — Qing Yuan Wu
(74) *Attorney, Agent, or Firm* — Elwood L. Haynes

(57) ABSTRACT

The invention relates to a valve for a pressurized fluid cylinder comprising a member for manually controlling a flow-regulating member, a sensor for detecting the position of the member for manually controlling the regulating member, a data acquisition, storage, and processing member, and a display for information relating to the fluid flow and/or pressure imposed by the regulating member and/or the valve use mode, wherein when the manual control member is disposed in an intermediate position between two respective adjacent values of the flow and/or pressure of the fluid allowed to pass from the upstream end to the downstream (Continued)

end, the data acquisition, storage and process member is designed to suppress the display information.

15 Claims, 2 Drawing Sheets

(52) U.S. Cl.
CPC .. *F17C 2201/032* (2013.01); *F17C 2201/058* (2013.01); *F17C 2205/0323* (2013.01); *F17C 2205/0326* (2013.01); *F17C 2221/00* (2013.01); *F17C 2221/011* (2013.01); *F17C 2223/013* (2013.01); *F17C 2223/0123* (2013.01); *F17C 2250/032* (2013.01); *F17C 2250/034* (2013.01); *F17C 2250/036* (2013.01); *F17C 2250/043* (2013.01); *F17C 2250/0408* (2013.01); *F17C 2250/0439* (2013.01); *F17C 2250/0491* (2013.01); *F17C 2250/0495* (2013.01); *F17C 2250/0694* (2013.01); *F17C 2250/075* (2013.01); *F17C 2250/077* (2013.01); *F17C 2260/028* (2013.01); *F17C 2260/038* (2013.01); *F17C 2270/02* (2013.01); *F17C 2270/025* (2013.01)

(56) References Cited

U.S. PATENT DOCUMENTS

| | | | |
|---|---|---|---|
| 6,098,646 | A | 8/2000 | Hennemann et al. |
| 6,518,749 | B1 | 2/2003 | Oudet et al. |
| 2004/0045608 | A1 | 3/2004 | Peters et al. |
| 2005/0103342 | A1 | 5/2005 | Jorczak et al. |
| 2008/0150739 | A1 | 6/2008 | Gamard |
| 2009/0050218 | A1 | 2/2009 | Burgess et al. |
| 2010/0132474 | A1 | 6/2010 | Bleys et al. |
| 2010/0245098 | A1 | 9/2010 | Kanie |
| 2011/0140850 | A1 | 6/2011 | Wassel et al. |

FOREIGN PATENT DOCUMENTS

| | | |
|---|---|---|
| FR | 2 868 160 | 9/2005 |
| FR | 2 915 798 | 11/2008 |
| GB | 2 486 018 | 6/2012 |
| WO | WO 2005 093377 | 10/2005 |
| WO | WO 2012 164240 | 12/2012 |

OTHER PUBLICATIONS

French Search Report and Written Opinion for related FR 1450524, dated Oct. 24, 2013.
French Search Report and Written Opinion for related FR 1450525, dated Oct. 24, 2013.
French Search Report and Written Opinion for related FR 1450526, dated Oct. 24, 2013.
French Search Report and Written Opinion for related FR 1450528, dated Oct. 24, 2013.
International Search Report and Written Opinion for corresponding PCT/FR2014/053124, dated Mar. 5, 2015.
International Search Report and Written Opinion for related PCT/FR2014/053044, dated Mar. 18, 2015.
International Search Report and Written Opinion for related PCT/FR2014/053460, dated Mar. 18, 2015.
International Search Report and Written Opinion for related PCT/FR2014/053045, dated Mar. 18, 2015.
International Search Report and Int'l Preliminary Report on Patentability for related PCT/FR2015/050011, dated Mar. 18, 2015.

VALVE FOR A PRESSURIZED FLUID CYLINDER AND CORRESPONDING CYLINDER

CROSS REFERENCE TO RELATED APPLICATIONS

This application is a 371 of International PCT Application PCT/FR2014/053124 filed Dec. 2, 2014 which claims priority to French Patent Application No. 1450527 filed Jan. 22, 2014, the entire contents of which are incorporated herein by reference.

BACKGROUND

The present invention relates to a valve for a pressurized fluid cylinder and to a corresponding cylinder.

SUMMARY

The invention relates more particularly to a valve for a pressurized fluid cylinder, comprising a body provided with an end intended to be mounted in the orifice of a pressurized fluid cylinder, the body of the valve accommodating a first withdrawing circuit comprising a first, upstream end intended to communicate with the storage volume of a pressurized fluid cylinder and a second, downstream end intended to be connected to a consumer of the withdrawn gas, the first withdrawing circuit comprising a member for regulating the flow rate and/or the pressure of the withdrawn fluid between the upstream end and the downstream end, the valve comprising a member for manually controlling the regulating member, the control member being mounted so as to be able to move relative to the body of the valve and cooperating with the regulating member to control the flow rate and/or pressure of fluid allowed to circulate from the upstream end to the downstream end depending on the position of the control member with respect to the body, the valve comprising an electronic device for indicating data relating to the fluid content in a cylinder connected to the valve, the electronic indicating device comprising a member for acquiring, storing and processing data and at least one data display connected to the member for acquiring, storing and processing data, the valve comprising a sensor for sensing the position of the member for manually controlling the regulating member, the position sensor being connected to the member for acquiring, storing and processing data in order to transmit to the latter a signal indicative of the fluid flow rate and/or pressure set by the regulating member, the member for acquiring, storing and processing data being configured to cause an information item relating to the fluid flow rate and/or pressure set by the regulating member and/or relating to the mode of use of the valve to be displayed on the display in response to the reception of this set flow rate and/or pressure signal.

The invention relates to a valve provided with an electronic device for indicating physical data relating to the content notably of pressurized gas in a pressurized fluid cylinder. The invention relates notably to a device known as an electronic digital pressure gage device. Reference may be made for example to the document FR2868160A1, which describes an example of such a device.

Such a device comprises a pressure sensor and an electronic logic which calculates and displays the data relating to the quantity of fluid and/or to autonomy.

In order to calculate and display such reliable autonomy information, the device has to take several successive pressure measurements before evaluating the flow rate selected by the valve user. This causes a calculating time which does not make it possible to immediately display a selected autonomy or withdrawing rate. Thirty to sixty seconds may be necessary, for example. In addition, this device also has an identical reaction time if the withdrawing parameters are changed (change in the selected withdrawing rate, etc.).

In addition, when the valve is used to supply oxygen to a medical ventilator (withdrawing rate set by the ventilator), the signal of pressure measured by the pressure gage undergoes a phase oscillation with the ventilation phases. On account of the great variety of ventilation modes, it is difficult to calculate or display a relevant information item.

Such a device also does not make it possible to signal and at the same time manage certain hazardous situations, notably when the user imperfectly selects a gas flow rate via the manual control member.

In known devices, if an incorrect value is selected, a warning is generated and the flow rate of gas withdrawn is maintained or interrupted.

It is an aim of the present invention to remedy all or some of the abovementioned drawbacks of the prior art.

To this end, the valve according to the invention, which is otherwise in accordance with the generic definition thereof given in the preamble above, is essentially characterized in that the manual control member and/or the regulating member is able to move into a plurality of separate positions that correspond to respective flow rate and/or pressure values of fluid allowed to pass from the upstream end to the downstream end, and in that when the manual control member is disposed in an intermediate position between two respective adjacent flow rate and/or pressure values of fluid allowed to pass from the upstream end to the downstream end, the member for acquiring, storing and processing data is configured to suppress the display of an information item relating to the fluid flow rate and/or pressure set by the regulating member or to select and display on the display or to output one or both of these adjacent values and/or a value between these two adjacent values and/or a range of values defined by these two adjacent values.

This makes it possible to rapidly and automatically indicate to the user that gas is being withdrawn, either on account of a medical ventilator being supplied, or on account of a leak.

Moreover, embodiments of the invention can include one or more of the following features:

when the manual control member is disposed in an intermediate position between two respective adjacent flow rate and/or pressure values, the member for acquiring, storing and processing data is configured to also generate a visible and/or audible warning signal, when the manual control member is disposed in an intermediate position between two respective adjacent flow rate and/or pressure values of fluid allowed to pass from the upstream end to the downstream end, the member for acquiring, storing and processing data is configured to calculate and display on the display or output an information item relating to the autonomy or content of fluid remaining in the cylinder on the basis of the higher value of the two adjacent values, when the manual control member is disposed in an intermediate position between two respective adjacent flow rate and/or pressure values of fluid allowed to pass from the upstream end to the downstream end, the member for acquiring, storing and processing data is configured to display on the display an information item relating to the fluid flow rate and/or pressure set by the regulating member that corresponds to the lower value of the two adjacent values, when the manual control member is disposed in an intermediate position between two respective adjacent flow rate and/or pressure values of fluid allowed to pass from the upstream end to the downstream end, the regulating member is designed to allow the withdrawal of fluid at a non-zero flow rate between said two respective adjacent flow rate and/or pressure values, notably the value displayed, when the manual control member is disposed in an intermediate position between two respective adjacent flow rate and/or pressure values of fluid allowed to pass from the upstream end to the downstream end, the regulating member is designed to allow the withdrawal of fluid at a flow rate equal to one of said two respective adjacent flow rate and/or pressure values, the regulating member comprises a flow rate regulator having calibrated orifices, the different-sized calibrated orifices of which can be disposed in turns on the path of the fluid in the first withdrawing circuit depending on the position of the manual control member, the sensor for sensing the position of the control member comprises at least one of: a capacitive sensor, an optical sensor, a magnetic sensor, a mechanical sensor, the sensor for sensing the position of the control member comprises a mechanism that meshes with the control member and a potentiometer, the mechanism having a movable part that forms a wiper of the potentiometer, the position sensor providing a voltage and/or resistance value determined depending on the position of the control member, the valve has a pressure sensor intended to measure the pressure within the storage volume of a fluid cylinder connected to the valve, the pressure sensor being connected to the member for acquiring, storing and processing data in order to transmit to the latter a signal indicative of the measured fluid pressure, the member for acquiring, storing and processing data being configured to calculate and display on the display an information item relating to the autonomy or content of remaining fluid in response to the reception of this pressure signal, the member for acquiring, storing and processing data is configured to receive both the signal of pressure measured by the pressure sensor and the flow rate and/or pressure signal provided by the position sensor and to calculate an information item relating to the autonomy of remaining fluid from these two information items, the autonomy of remaining fluid being determined by calculating, from the initial pressure measured, the theoretical decrease over time in pressure or the quantity of gas generated by the withdrawing flow rate and/or pressure set by the regulating member, the member for acquiring, storing and processing data is configured to:
  calculate the actual variation in fluid quantity or pressure measured by the pressure sensor,
  calculate the theoretical variation in fluid quantity or pressure set by the regulating member,
  compare the actual variation in quantity or pressure measured by the pressure sensor with the theoretical variation in quantity or pressure set by the regulating member, and
  generate a warning signal if the theoretical and actual variations diverge to an extent greater than a given safety threshold.

the member for manually controlling the regulating member is movable into a position known as the "closed" position corresponding to closure of the first withdrawing circuit, that is to say that the flow rate of fluid allowed to pass from the upstream end to the downstream end is zero, and when the manual control member is in its closed position and the variation in the signal indicative of the fluid pressure within a cylinder is lower than a given variation threshold, the member for acquiring, storing and processing data is configured to cause a fixed information item relating to the pressure and/or quantity of fluid in the cylinder to be displayed on the display, the sensor for sensing the position of the control member comprises a converter for converting a mechanical movement of the control member into an electrical signal that is exploitable by the member for acquiring, storing and processing data, when the manual control member is in its position known as the closed position and the variation in the signal indicative of the fluid pressure within a cylinder is greater than a given variation threshold, the member for acquiring, storing and processing data is configured to calculate an information item relating to the autonomy of remaining fluid from the measurement of the initial-pressure signal and the variation in this pressure signal provided by the pressure sensor, the member for acquiring, storing and processing data being configured to cause this calculated autonomy information item and/or an information item relating to the initial quantity or pressure of fluid in the cylinder to be displayed on the display, when the manual control member is in its position known as the closed position and the variation in the signal indicative of the fluid pressure within a cylinder is greater than a given variation threshold, the member for acquiring, storing and processing data is configured to detect at least one characteristic of the form of the variation in fluid pressure in the cylinder on account of the withdrawal via the second withdrawing circuit, the at least one characteristic comprising: a periodic character of the variation in pressure or quantity, the frequency of the variation in pressure or quantity, the level of variation in pressure or quantity, at least one of the components and notably one of the sensors (position sensor, pressure sensor) is of the electrical type and powered by a battery and/or an inductive system, said at least one component being able to be powered non-continuously in order to save energy, it being possible for the member for acquiring, storing and processing data to be configured to ensure this power supply when a measurement is taken, when the manual control member is in its closed position and the variation in the signal indicative of the fluid pressure within a cylinder is greater than a given variation threshold, the member for acquiring, storing and processing data is configured to calculate an information item relating to the autonomy of remaining fluid from the measurement of the initial-pressure signal and the variation in this pressure signal provided by the pressure sensor, the member for acquiring, storing and processing data being configured to cause this calculated autonomy information item and/or an information item relating to the initial quantity or pressure of fluid in the cylinder to be displayed on the display, the member for acquiring, storing and processing data is configured to recalculate and display automatically an update of the information relating to the autonomy or content of fluid on receiving a signal from the position sensor indicating a change in fluid flow rate and/or pressure set by the regulating member via the control member, the member for acquiring, storing and processing data is configured to calculate an information item relating to the autonomy or content of fluid over a given period of time of between thirty seconds and ten minutes, preferably between one minute and six minutes, from the pressure signal measured by the pressure sensor, the member for acquiring, storing and processing data also being configured to compare this autonomy information calculated on the basis of the measured pressure signal with the theoretical autonomy information calculated from the variation in quantity or pressure set by the regulating member, the information relating to the autonomy or content of fluid remaining in the cylinder is expressed in time remaining (or, respectively, in quantity remaining) by dividing the initial pressure measured by the pressure sensor (or, respectively, a quantity of gas flowing) by the theoretical variation in pressure set by the regulating member (or, respectively, the variation in quantity set by the regulating member), by a formula of the type: Time remaining=Initial pressure/variation in pressure set (or, respectively: Time remaining=Remaining quantity/variation in quantity set), the initial quantity being estimated via the perfect gas equation $PV=nRT$ or real gas equation $PV=ZnRT$ (S.I. units), wherein P is the pressure measured, V the known volume of the cylinder, n the quantity, R the perfect gas constant and T the temperature measured or approximated to the ambient temperature measured, Z the compressibility known or given by a table or calculation.

The invention also relates to a pressurized fluid cylinder comprising a valve according to any one of the above or following features.

According to one possible particular feature, after the cylinder has been filled and before first withdrawal, the member for acquiring, storing and processing data is configured to cause a fixed information item relating to the fluid content in the cylinder to be displayed on the display until the position sensor transmits a signal indicative of a flow rate and/or the pressure of fluid withdrawn from the reservoir for a given time and/or corresponding to a given quantity of fluid.

The invention can also relate to any alternative device or method comprising any combination of the above or following features.

BRIEF DESCRIPTION OF THE DRAWINGS

Further particular features and advantages will become apparent from reading the following description, which is given with reference to the figures, in which.

DESCRIPTION OF PREFERRED EMBODIMENTS

Figure 1:
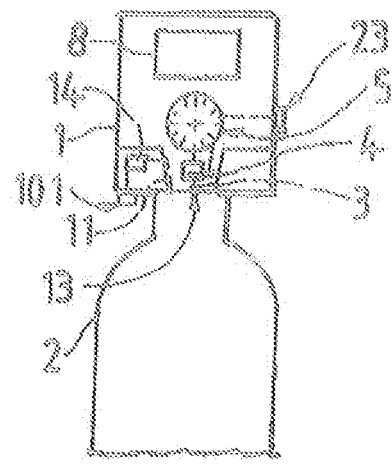
FIG. 1 shows a schematic and partial side view illustrating a valve mounted on a pressurized gas cylinder according to one possible exemplary embodiment of the invention, FIG. 2 schematically and partially illustrates the structure and operation of a part of the valve from FIG. 1, FIGS. 3 to 5 schematically and partially illustrate the structure and operation of three respective examples of position sensors of a valve according to the invention, FIG. 6 schematically shows two curves illustrating examples of signals generated by one or more position sensors from FIG. 5, FIGS. 7 and 8 schematically and partially illustrate the structure and operation of a fourth example and a fifth example, respectively, of a position sensor of the valve according to the invention, FIG. 9 schematically shows an example of a pressure curve measured over time.

FIG. 1 schematically shows a pressurized gas cylinder 2 provided with a valve 1 that is able to implement the invention.

The valve 1 comprises a body provided with an end intended to be mounted in the orifice of a pressurized fluid cylinder 2 (for example by screwing).

In a conventional manner, the body of the valve 1 accommodates a first withdrawing circuit 3 comprising a first, upstream end 13 communicating with the storage volume of the cylinder 2. The withdrawing circuit 3 comprises a second, downstream end 23 intended to be connected to a consumer of the withdrawn gas (for example a patient in the case of oxygen or some other medical gas).

The first withdrawing circuit 3 comprises a member 4 for regulating the flow rate and/or the pressure of the withdrawn fluid between the upstream end 13 and downstream end 23. This regulating member 4 is for example a flow rate regulator having calibrated orifices 16, making it possible to select a withdrawn gas flow rate (cf. the schematic depiction in FIG. 3). Of course, any other regulating member is conceivable, for example a valve with a proportional opening.

The valve 1 comprises a member 5 for manually controlling the member 4. The control member 5 is mounted so as to be able to move relative to the body of the valve 1 and cooperates with the regulating valve 4 to control the flow rate and/or pressure of fluid allowed to circulate depending on the position of the control member 5 with respect to the body of the valve. The control member 5 comprises for example a rotary hand wheel. Of course, any other appropriate system is conceivable (pivoting lever, digital control, wireless control via a remote control, etc.). For example, the control member 5 selects a calibrated orifice and/or controls a flow rate restriction valve depending on its position among a plurality of separate stable positions or a plurality of positions of a continuous movement. In particular the stable positions can be mechanically referenced by a hard point (for example via a detent system).

The valve 1 comprises an electronic device 6 for indicating data relating to the content of fluid in a cylinder 2 connected to the valve 1. The device can be of the type comprising a member 7 for acquiring, storing and processing data and at least one data display 8 connected to the member 7 for acquiring, storing and processing data. The member 7 for acquiring, storing and processing data comprises for example a computer and/or a microprocessor or any other equivalent system.

Of course, this device can have one or more data receiving members (via a wired and/or wireless connection) and also one or more data output members (via a wired and/or wireless connection).

The valve 1 preferably has a sensor 9 for sensing the position of the member 5 for manually controlling the regulating member 4. The position sensor 9 is connected to the member 7 for acquiring, storing and processing data in order to transmit to the latter a signal indicative of the fluid flow rate and/or pressure set by the regulating member 4. For example, the sensor 9 for sensing the position of the control member 5 comprises a converter for converting the mechanical movement of the control member into an electrical signal that is exploitable by the member 7 for acquiring, storing and processing data.

The detector is for example secured to a fixed part of the valve or, respectively, the control member, the detector outputting an electrical or digital signal determined depending on the position of the control member 5. This signal can be output in a wired and/or wireless manner.

The sensor 9 for sensing the position of the control member 5 can comprise for example at least one of: a capacitive sensor, a magnetic sensor, a mechanical sensor, an optical sensor.

The manual control member 5 and/or the regulating member 4 may be able to move into a plurality of separate positions (which are or are not mechanically stable) that correspond to respective flow rate and/or pressure values of fluid allowed to pass from the upstream end 13 to the downstream end. According to one advantageous particular feature, when the manual control member 5 is disposed in an intermediate position between two respective adjacent flow rate and/or pressure values of fluid allowed to pass from the upstream end 13 to the downstream end 23, the member 7 for acquiring, storing and processing data is configured to select and display on the display 8 one or both of these adjacent values or an intermediate value between these two adjacent values. Alternatively, when the manual control member 5 is disposed in an intermediate position between two respective adjacent flow rate and/or pressure values, the member 7 for acquiring, storing and processing data can be configured to display a flow rate/pressure range delimited by the two adjacent values. For example, if the user positions the control member 5 between the positions "n liters per minute" and "n+1 liters per minute" (n being an integer), the member 7 for acquiring, storing and processing data can be configured to display "between n and n+1 liters per minute".

Alternatively, in this scenario, the member 7 for acquiring, storing and processing data can be configured to suspend the display of all or some of the figures. In other words, in the event of an incorrect selected between two adjacent values, the display no longer displays the selected flow rate/pressure value or the value of the autonomy or the content calculated to remain in the cylinder. The latter solution will also have a greater influence on the user to correct his incorrect selection.

Preferably, the member 7 for acquiring, storing and processing data displays and/or signals the most critical or most unfavorable value for the user (wireless remote transmission or wired or audible transmission).

This makes it possible to ergonomically warn the user of incorrect manipulation by displaying relevant but disadvantageous information, obliging him to correct his selection.

For example, when the manual control member 5 is disposed in an intermediate position between two respective adjacent flow rate values, the member 7 for acquiring, storing and processing data is configured to calculate and display on the display 8 an information item relating to the autonomy or content of fluid remaining in the cylinder on the basis of the higher value of the two adjacent values.

Thus, if, for example, the user positions the control member 5 between the positions n liters per minute and n+1 liters per minute (n being an integer), the member 7 for acquiring, storing and processing data can be configured to calculate autonomy based on the withdrawn flow rate value of n+1 liters per minute (less autonomy than if it had been calculated with the value of n liters per minute).

Similarly, when the manual control member 5 is disposed in an intermediate position between two respective adjacent flow rate values, the member 7 for acquiring, storing and processing data can be configured to display on the display 8 an information item relating to the withdrawn flow rate set by the regulating member 4 that corresponds to the lower value of the two adjacent values. Thus, if, for example, the user positions the control member 5 between the positions n liters per minute and n+1 liters per minute (n being an integer), the member 7 for acquiring, storing and processing data can be configured to display on the display 8 an information item based on the withdrawn flow rate value of n liters per minute (the lower flow rate, which may for example be less than the medical prescription). This, in addition to or instead of an alarm, will cause the user to react so as to correct the flow rate selection.

The device can be configured to deliver in this case a fluid flow rate corresponding to one of the two adjacent values, notably the displayed value.

Preferably, when the manual control member 5 is disposed in an intermediate position between two respective adjacent flow rate and/or pressure values of fluid allowed to pass from the upstream end 13 to the downstream end 23, the regulating member 4 is designed to allow the withdrawal of fluid at a non-zero flow rate between said two respective adjacent flow rate and/or pressure values, notably the value displayed.

Alternatively, when the manual control member 5 is disposed in an intermediate position between two respective adjacent flow rate and/or pressure values of fluid allowed to pass from the upstream end 13 to the downstream end 23, the regulating member 4 is designed to allow the withdrawal of fluid at a flow rate equal to one of said two respective adjacent flow rate and/or pressure values.

In addition, when the regulating member 4 makes it possible to vary the flow rate or pressure continuously (in a non-discrete manner), the member 7 for acquiring, storing and processing data can be configured to display the actual flow rate value selected.

Figure 3:
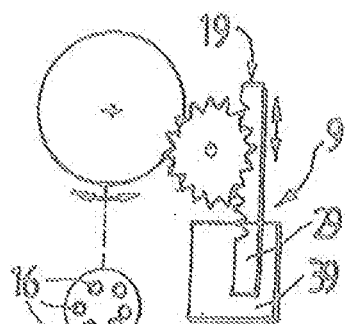

As illustrated in FIG. 3, the sensor 9 for sensing the position of the control member 5 can comprise for example a mechanism 19 that meshes with the control member 5 (a meshing and/or notching system) and a potentiometer 39. The mechanism has a moving part 29 (for example a wheel or a rod or a rack) that forms a wiper of the potentiometer 39. In this way, the position sensor 9 supplies a voltage and/or resistance value determined depending on the position of the control member 5.

Figure 4:
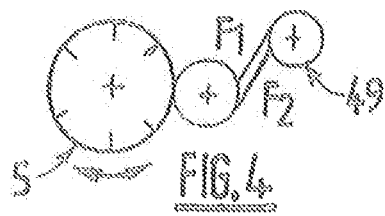

In the example in FIG. 4, the sensor 9 for sensing the position of the control member 5 comprises a mechanism that meshes with the control member 5 comprising an optical and/or digital encoder 49, for example a wired encoder (live wire and ground wire). The encoder 49 supplies a digital signal determined depending on the position of the control member 5. Depending on the position of the mechanism, one or more wires are live or short-circuited, forming a plurality of separate signals for characterizing different positions (for example $2^{n-1}$ for a system having n wires).

Figure 5:
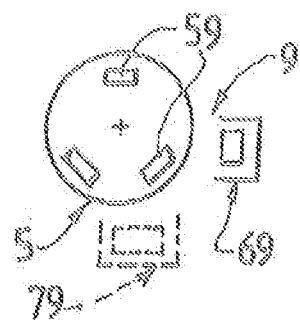
Figure 6:
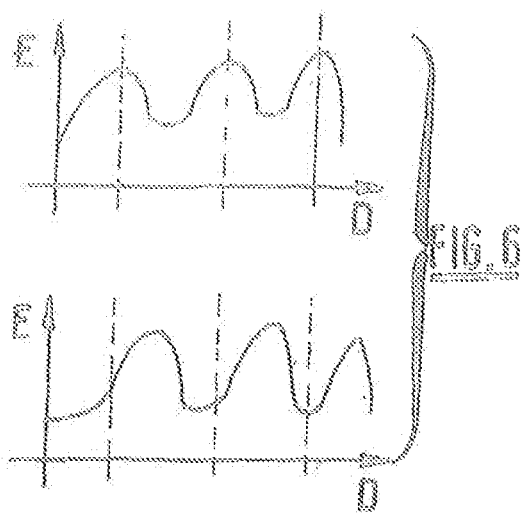

As illustrated in FIG. 5, the sensor 9 for sensing the position of the control member 5 can comprise a magnetic system having at least one magnet 59 secured to the control member 5 and at least one detector 69, 79 for detecting the magnetic field of the at least one magnet 59. For example three magnets 59 are secured to the control member 5. If the control member 5 moves (such as by rotation), one detector 69 detects for example a magnetic field E depending on the movement D which oscillates and makes it possible to characterize a plurality of positions (cf. FIG. 6). When the device comprises a second detector 79 (or more), several separate signals can be exploited simultaneously in order to improve the detection of the separate positions.

Figure 7:
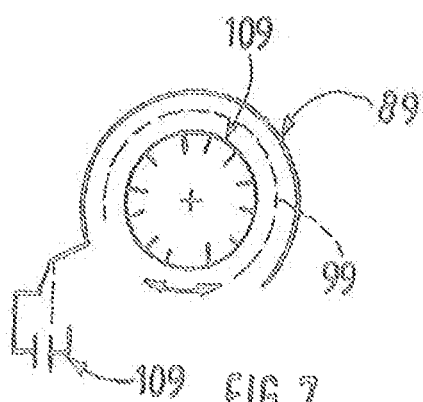
Figure 8:
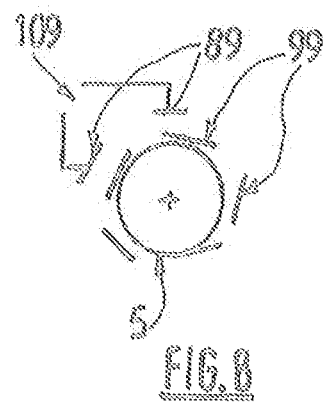

As illustrated in FIGS. 7 and 8, the sensor 9 for sensing the position of the control member 5 can comprise a capacitive system 109 that measures an electrical capacitance between a fixed magnetic reference 89 and a moving part 99 connected to the control member 5.

All of these systems have the advantage of reliable detection without the need to provide electric wires linked to a moving part of the mechanism.

The potentiometer system and more generally each detection system can be calibrated easily during production.

For example, the potentiometer 39 or detector of the sensor 9 for sensing the position of the control member 5 can be calibrated by measuring the voltage or resistance value (or magnetic field and capacitance value) that it supplies corresponding to said closed position (zero flow rate). Next, it is possible to measure the voltage or resistance value supplied by the potentiometer 39 which corresponds to an extreme position of the control member 5 with respect to the closed position. The intermediate voltage or resistance values supplied by the potentiometer 39 are attributed respectively to the intermediate positions of the control member 5 between the closed position and the extreme position. (Likewise for the detection of some other physical variable, magnetic field, capacitance, etc., where the intermediate positions of the signal can be allocated respectively to the intermediate positions of the control member 5).

Alternatively or in addition, the potentiometer 39 of the sensor 9 for sensing the position of the control member 5 can be calibrated by measuring the voltage or resistance value that it supplies corresponding to a position of the control member 5 in which no pressure variation is measured by the pressure sensor 10 for a given time, for example one to three minutes. This position (this value of the signal) is defined as being the closed position of the circuit (zero flow rate). This way of defining the closed position can be applied to the other examples (magnetic field, capacitance, etc.).

Figure 2:
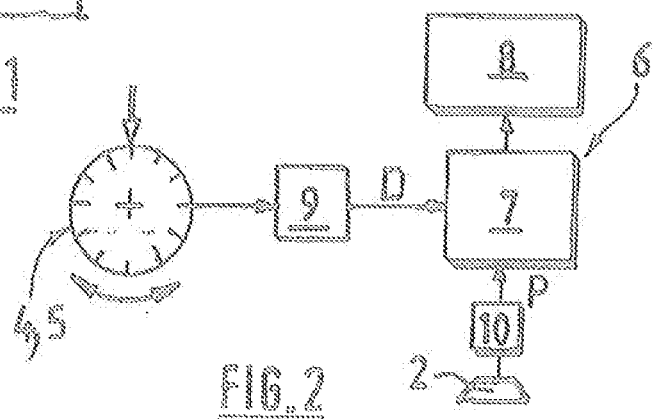

As illustrated in FIG. 2, the valve preferably also has a pressure sensor 10 intended to measure the pressure within the storage volume of the cylinder 2. The pressure sensor 10 is connected to the member 7 for acquiring, storing and processing data in order to transmit to the latter (in a wired and/or wireless manner) a signal indicative of the fluid pressure measured, notably in real time or periodically.

The member 7 for acquiring, storing and processing data can be configured to calculate and display on the display 8 an information item relating to the autonomy or content of remaining fluid in response to the reception of this pressure signal delivered by the sensor 10.

Preferably, the member 5 for manually controlling the regulating member 4 is movable into a position known as the "closed" position corresponding to closure of the first withdrawing circuit 3. In other words, the flow rate of fluid allowed to pass from the upstream end 13 to the downstream end 23 is zero. When the manual control member 5 is in its closed position and the variation in the signal indicative of the fluid pressure within a cylinder 2 is lower than a given variation threshold (for example equivalent to a pressure drop of 10 mbar/min (0.05 l/min) measured by the pressure sensor 10), the member 7 for acquiring, storing and processing data is preferably configured to cause a fixed information item relating to the pressure and/or quantity of fluid in the cylinder 2 to be displayed on the display 8.

In other words, the device detects that the cylinder 12 is not being emptied and displays for example an information item relating to its content.

As illustrated in FIG. 1, the valve 1 preferably comprises a second withdrawing circuit 11, for example separate from the first withdrawing circuit 3, which bypasses the flow rate and/or pressure regulating member 4 of the first withdrawing circuit 3.

If need be, this second withdrawing circuit 11 can have a portion in common with the first withdrawing circuit 3.

This second withdrawing circuit 11 is provided for example to supply a gas at a regulated pressure (via a pressure relief valve 14). For example, the second withdrawing circuit 11 supplies a variable or fixed pressure of around 3 to 10 bar to a user appliance. For example, the second withdrawing circuit 11 has an outlet connection 101 (for example via a toothed connector) that can be connected to a medical ventilator in order to supply oxygen thereto.

This second withdrawing circuit 11 can supply gas from the cylinder 2 independently of the first withdrawing circuit 3. Thus, when the manual control member 5 is in its closed position and the variation in the signal indicative of the fluid pressure within a cylinder 2 (measured by the pressure sensor 10) is greater than a given variation threshold (for example 25 mbar per minute), the member 7 for acquiring, storing and processing data can detect withdrawal of fluid via the second withdrawing circuit 11 or, if this second withdrawing circuit 11 is not being used, a possible leak of fluid.

The member 7 for acquiring, storing and processing data can, if need be, cause an information item relating to withdrawal via the second withdrawing circuit 11 and or relating to a leak (warning signal) to be displayed on the display 8 or to be output (wirelessly, in a wired manner or audibly).

In particular, when the manual control member 5 is in its position known as the closed position and the variation in the signal indicative of the fluid pressure within a cylinder is greater than a given variation threshold (for example 25 mbar per minute), the member 7 for acquiring, storing and processing data is configured to detect at least one characteristic of the form of the variation in fluid pressure in the cylinder on account of the withdrawal via the second withdrawing circuit 11.

The at least one characteristic comprises for example: a periodic character of the variation in pressure or quantity, the frequency of the variation in pressure or quantity, the level of variation in pressure or quantity, etc.

As illustrated schematically in FIG. 10, this makes it possible to instantaneously detect, at the end of two to three pressure oscillations, for example periodic withdrawal corresponding to a gas supply to a respiratory ventilator. Specifically, even if the gas withdrawn does not pass through the flow rate regulator 4, the flow rate is regulated directly by a ventilator and depends on the patient's breathing. This flow rate thus delivered is not constant but oscillates over time (depending on the patient's breathing).

The member 7 for acquiring, storing and processing data can be configured to detect (recognize) a drop in pressure characteristic of ventilation using the following principle:

measuring the pressure signal in a close periodic manner (for example every 0.5 to two seconds, notably every second), identifying a signal of the square wave type with a frequency of five to twenty-five square waves (respirations) per minute.

Figure 9:
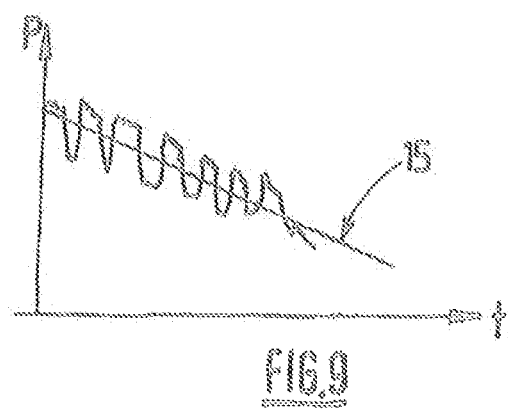

In order to calculate the remaining gas autonomy from such a signal, the member 7 for acquiring, storing and processing data can be configured to measure the pressure drop over the optima in order to deduce therefrom the equivalent rate of decrease (cf. reference 15 in FIG. 9). Alternatively or in addition, the member 7 for acquiring, storing and processing data can be configured to work out an average drop in pressure over a relatively long time (several minutes, for example ten minutes) so as to remove image inaccuracies.

In the event that this pressure signal does not correspond to a ventilation signal (for example a continuous decreasing variation), the member 7 for acquiring, storing and processing data can determine that it is a leak or incorrect use of the gas, and can signal this in the same way.

Thus, in this case, the simultaneous detection of the closed position (scale "0"="zero" for example) at the position detector 5 and a pressure drop, it is then possible to instantaneously and automatically detect the mode of use of the cylinder 2. A rapid autonomy calculation algorithm described below is not used, and an autonomy calculation appropriate for this manner of withdrawal can be carried out by the member 7 for acquiring, storing and processing data.

This autonomy calculation algorithm based on the pressure measurement 10 can then be initiated automatically.

In addition, when the manual control member 5 is in its closed position and the variation in the signal indicative of the fluid pressure within a cylinder 2 is greater than a given variation threshold, the member 7 for acquiring, storing and processing data can be configured to calculate an information item relating to the autonomy of remaining fluid from the measurement of the initial-pressure signal and the variation in this pressure signal provided by the pressure sensor 10. The member 7 for acquiring, storing and processing data can notably be configured to cause this calculated autonomy information item and/or an information item relating to the initial quantity or pressure of fluid in the cylinder 2 to be displayed on the display 8.

The pressure sensor 10 can be situated for example at the upstream end of the first withdrawing circuit 3 and/or at the second withdrawing circuit 11.

In addition, the member 7 for acquiring, storing and processing data can be configured to cause an information item relating to the fluid flow rate and/or pressure set by the regulating member 4 to be displayed on the display 8 in response to the reception of this set flow rate and/or pressure signal.

The member 7 for acquiring, storing and processing data can thus be configured to receive both the signal of pressure P measured by the pressure sensor 10 and the flow rate and/or pressure D signal supplied by the position sensor 9. The member 7 for acquiring, storing and processing data can thus be programmed to calculate an information item relating to the autonomy of remaining fluid from these two information items, the autonomy of remaining fluid being determined by calculating, from the initial pressure measured, the theoretical decrease over time in pressure or the quantity of gas generated by the withdrawing flow rate and/or pressure D set by the regulating member 4.

In addition, the member 7 for acquiring, storing and processing data can be configured to:
calculate the actual variation in fluid quantity or pressure measured by the pressure sensor 10,
calculate the theoretical variation in fluid quantity or pressure set by the regulating member 4,
compare the actual variation in quantity or pressure measured by the pressure sensor 10 with the theoretical variation in quantity or pressure set by the regulating member 4, and
generate a warning signal if the theoretical and actual variations diverge to an extent greater than a given safety threshold (for example diverge by 15 to 30%, and notably 25%).

The information relating to the autonomy or content of fluid remaining in the cylinder 2 can be expressed in time remaining (or, respectively, in quantity remaining) by dividing the initial pressure measured by the pressure sensor 10 (or, respectively, a quantity of gas flowing) by the theoretical variation in pressure set by the regulating member 4 (or, respectively, the variation in quantity set by the regulating member (4)), by a formula for example of the type: Time remaining=Initial pressure/variation in pressure set (or, respectively: Time remaining=Remaining fluid content/variation in quantity set).

The theoretical variations in quantity or pressure can be calculated for example via the perfect gas equation $PV=nRT$ or real gas equation $PV=ZnRT$ (S.I. units), where P is the pressure measured, V the known volume of the cylinder, n the quantity, R the perfect gas constant and T the temperature measured or approximated to the ambient temperature measured, Z the compressibility factor presumed to be known (table or calculation). Similarly, the conversions between pressure and quantity can be calculated via the perfect gas equation or any other equivalent formula, the volume of the cylinder 2 being known and entered in the member 7 for acquiring, storing and processing data and the temperature can be measured by an ambient external sensor or calculated or entered or approximated.

The member 7 for acquiring, storing and processing data can be configured to calculate an information item relating to the autonomy or content of fluid over a given period of time of between fifteen seconds and ten minutes, and preferably between thirty seconds and five minutes, from the signal of pressure measured by the pressure sensor 10. The member 7 for acquiring, storing and processing data can also be configured to compare this autonomy information calculated on the basis of the measured pressure P signal with the theoretical autonomy information calculated from the variation in quantity or pressure set by the regulating member 4.

The dynamic pressure measurement can make it possible to adjust the display of the effective flow rate withdrawn and/or the autonomy displayed more precisely, if necessary.

Similarly, the member 7 for acquiring, storing and processing data can be configured to recalculate and display automatically an update of the information relating to the autonomy or content of fluid on receiving a signal from the position sensor 9 indicating a change in fluid flow rate and/or pressure set by the regulating member 4 via the control member 5.

In addition, the member 7 for acquiring, storing and processing data can be configured to have a guarantee seal function indicating that the cylinder 2 has not been used after being filled. Thus, before first withdrawal, the member 7 for acquiring, storing and processing data can cause a fixed information item relating to the fluid content in the cylinder 2 (and/or the information item of the "cylinder full" type) to be displayed on the display 8 until the position sensor 9 transmits a signal indicative of a flow rate and/or the pressure of fluid withdrawn from the reservoir 2 for a given time and/or corresponding to a given quantity of fluid (for example 20 liters of gas withdrawn). This detection can be carried out or completed by the information provided by the pressure sensor 10.

Although the invention is relatively simple and inexpensive, it is easy to see that it makes it possible to display flow rate and autonomy information more quickly.

The invention applies advantageously to pressurized gas cylinders, notably cylinders containing pressurized oxygen.

The invention claimed is:

1. A valve for a pressurized fluid cylinder, the valve comprising:
   a body provided with an end configured to be mounted in an orifice of the pressurized fluid cylinder,
   the body of the valve accommodating a first withdrawing circuit comprising a first, upstream end intended to communicate with a storage volume of the pressurized fluid cylinder and a second, downstream end configured to be connected to a consumer,
   the first withdrawing circuit comprising a member for regulating a flow rate and/or a pressure of a withdrawn fluid between the upstream end and the downstream end,
   a member for manually controlling the regulating member,
   the control member being mounted to be able to move relative to the body of the valve and cooperating with the regulating member to control the flow rate and/or pressure of fluid allowed to circulate from the upstream end to the downstream end depending on a position of the control member with respect to the body,
   an electronic device for indicating data relating to a fluid content in the pressurized fluid cylinder,
   the electronic indicating device comprising a member for acquiring, storing and processing data and at least one data display connected to the member for acquiring, storing and processing data,
   a sensor for sensing a position of the member for manually controlling the regulating member,
   the position sensor being connected to the member for acquiring, storing and processing data in order to transmit a signal indicative of the fluid flow rate and/or pressure set by the regulating member,
   the member for acquiring, storing and processing data being configured to cause an information item relating to the fluid flow rate and/or pressure set by the regulating member and/or relating to a mode of use of the valve to be displayed on the display in response to a reception of this set flow rate and/or pressure signal, wherein the manual control member and/or the regulating member is able to move into a plurality of separate positions that correspond to respective flow rate and/or pressure values of fluid allowed to pass from the upstream end to the downstream end, and in that when the manual control member is disposed in an intermediate position between two respective adjacent flow rate and/or pressure values of fluid allowed to pass from the upstream end to the downstream end,
   the member for acquiring, storing and processing data being configured to suppress the display of an information item relating to the fluid flow rate and/or pressure set by the regulating member or to select and display on the display or to output one or both of these respective adjacent values and/or a value between these two respective adjacent values and/or a range of values defined by these two respective adjacent values.

2. The valve of claim 1, wherein when the manual control member is disposed in an intermediate position between two respective adjacent flow rate and/or pressure values, the member for acquiring, storing and processing data is configured to also generate a visible and/or audible warning signal.

3. The valve of claim 1, wherein when the manual control member is disposed in an intermediate position between two respective adjacent flow rate and/or pressure values of fluid allowed to pass from the upstream end to the downstream end, the member for acquiring, storing and processing data is configured to calculate and display on the display or output an information item relating to an autonomy or content of fluid remaining in the pressurized fluid cylinder on the basis of the higher value of the two respective adjacent values.

4. The valve of claim 1, wherein when the manual control member is disposed in an intermediate position between two respective adjacent flow rate and/or pressure values of fluid allowed to pass from the upstream end to the downstream end, the member for acquiring, storing and processing data is configured to display on the display an information item relating to the fluid flow rate and/or pressure set by the regulating member that corresponds to the lower value of the two respective adjacent values.

5. The valve of claim 1, wherein when the manual control member is disposed in an intermediate position between two respective adjacent flow rate and/or pressure values of fluid allowed to pass from the upstream end to the downstream end, the regulating member is designed to allow the withdrawal of fluid at a non-zero flow rate between said two respective adjacent flow rate and/or pressure values.

6. The valve of claim 1, wherein when the manual control member is disposed in an intermediate position between two respective adjacent flow rate and/or pressure values of fluid allowed to pass from the upstream end to the downstream end, the regulating member is designed to allow the withdrawal of fluid at a flow rate equal to one of said two respective adjacent flow rate and/or pressure values.

7. The valve of claim 1, wherein the regulating member further comprises a flow rate regulator having calibrated orifices with different-sized calibrated orifices, the different-sized calibrated orifices of which can be disposed in turns on a path of the fluid in the first withdrawing circuit depending on the position of the manual control member.

8. The valve of claim 1, wherein the sensor for sensing the position of the control member further comprises at least one of: a capacitive sensor, an optical sensor, a magnetic sensor, a mechanical sensor.

9. The valve of claim 1, wherein the sensor for sensing the position of the control member further comprises a mechanism that meshes with the control member and a potentiometer, the mechanism having a movable part that forms a wiper of the potentiometer, the position sensor providing a voltage and/or resistance value determined depending on the position of the control member.

10. The valve of claim 1, further comprising a pressure sensor configured to measure a pressure within the storage volume of the pressurized fluid cylinder, the pressure sensor being connected to the member for acquiring, storing and processing data in order to transmit a signal indicative of the measured fluid pressure, the member for acquiring, storing and processing data being configured to calculate and display on the display an information item relating to an autonomy or content of remaining fluid in response to a reception of this pressure signal.

11. The valve of claim 10, wherein the member for acquiring, storing and processing data is configured to receive both the signal of pressure measured by the pressure sensor and the flow rate and/or pressure signal provided by the position sensor and to calculate an information item relating to the autonomy of remaining fluid from these two information items, the autonomy of remaining fluid being determined by calculating, from an initial pressure measured, a theoretical decrease over time in pressure or a quantity of fluid generated by the withdrawing flow rate and/or pressure set by the regulating member (4).

12. The valve of claim 10, wherein the member for acquiring, storing and processing data is configured to:
 Calculate an actual variation in fluid quantity or pressure measured by the pressure sensor,
 calculate a theoretical variation in fluid quantity or pressure set by the regulating member,
 compare an actual variation in quantity or pressure measured by the pressure sensor with the theoretical variation in quantity or pressure set by the regulating member, and
 generate a warning signal if the theoretical and actual variations diverge to an extent greater than a given safety threshold.

13. The valve of claim 10, wherein the member for manually controlling the regulating member is movable into a closed position corresponding to closure of the first withdrawing circuit, and in that, when the manual control member is in the closed position and a variation in the signal indicative of the fluid pressure within the pressurized fluid cylinder is lower than a given variation threshold, the member for acquiring, storing and processing data is configured to cause a fixed information item relating to the pressure and/or quantity of fluid in the cylinder to be displayed on the display.

14. A pressurized fluid cylinder, comprising a valve as claimed in claim 1.

15. The cylinder of claim 14, wherein after the cylinder has been filled and before first withdrawal, the member for acquiring, storing and processing data is configured to cause a fixed information item relating to the fluid content in the cylinder to be displayed on the display until the position sensor transmits a signal indicative of a flow rate and/or the pressure of fluid withdrawn from the reservoir for a given time and/or corresponding to a given quantity of fluid.

* * * * *